UNITED STATES PATENT OFFICE.

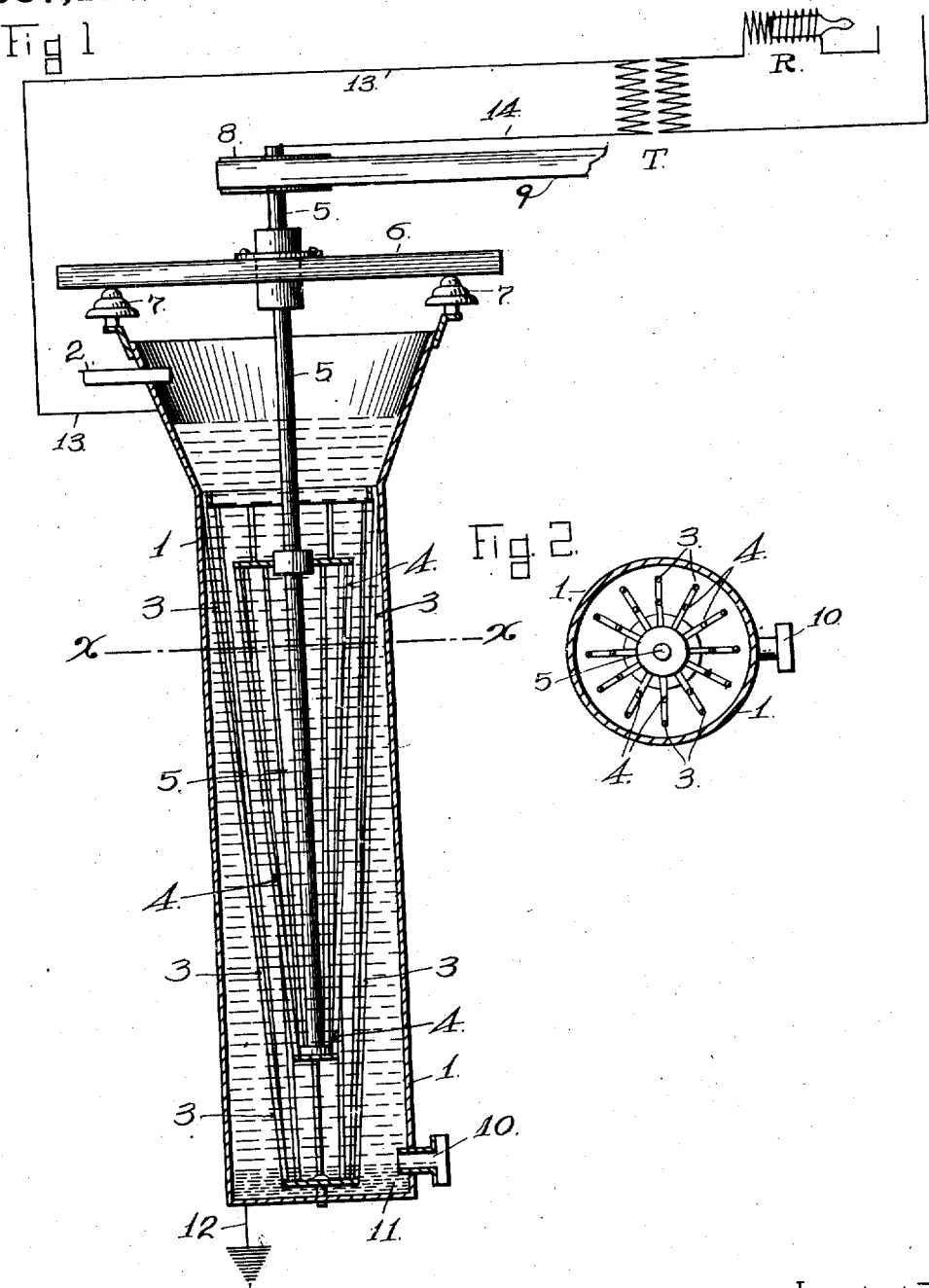

FREDERICK GARDNER COTTRELL AND ALLEN CHEEVER WRIGHT, OF BERKELEY, CALIFORNIA, ASSIGNORS, BY MESNE ASSIGNMENTS, TO PETROLEUM RECTIFYING COMPANY, OF SAN FRANCISCO, CALIFORNIA, A CORPORATION OF CALIFORNIA.

SEPARATING AND COLLECTING PARTICLES OF ONE LIQUID SUSPENDED IN ANOTHER LIQUID.

987,117.      Specification of Letters Patent.      Patented Mar. 21, 1911.

Application filed December 1, 1910. Serial No. 595,099.

*To all whom it may concern:*

Be it known that we, FREDERICK GARDNER COTTRELL and ALLEN CHEEVER WRIGHT, citizens of the United States, residing at Berkeley, in the county of Alameda and State of California, have invented certain new and useful Improvements in Separating and Collecting Particles of One Liquid Suspended in Another Liquid, of which the following is a specification.

Our invention relates to the art of separating mechanical mixtures of liquids, such as emulsions of water in oil, and particularly to those processes and methods forming the subject matter of and disclosed in that certain pending application for Letters Patent made by Frederick Gardner Cottrell (one of the present applicants) jointly with James Buckner Speed, originally filed May 20, 1909 under Serial Number 497,167, allowed Aug. 24, 1909, and renewed under Serial Number 586,794, filed Oct. 12, 1910, and again allowed Oct. 18, 1910. As in said application, so in this, our improvement will be described as applied to the separation and removal of water particles from crude petroleum but it is to be understood that we do not limit our claims to this particular case.

Much of the crude petroleum as it comes from the wells contains drops of water, varying in size from those easily visible to the naked eye to a minuteness lying at the extreme range of vision of the most powerful microscope. The usual processes of settling, and of centrifuging are not wholly effective; and that of distillation is expensive and not entirely practical; hence the process disclosed in said former application, which process for the better understanding of the present improvement need only be briefly stated as consisting in subjecting the emulsion to the action of a powerful electric field, by bringing it between highly charged electrodes, whereby the particles constituting the inner phase of the emulsion are caused to coalesce into larger masses which may then be easily separated out, thus fulfilling a useful purpose in the art. In said former application the importance of preventing the formation of short-circuiting chains of particles was emphasized by pointing out the danger of allowing the active surfaces of the electrodes to emerge from the liquid or even to come too close to the surface, for in such case there is a tendency for the partially agglomerated water to collect in the surface layers and cause short-circuiting of the electrode; also, by calling attention to the down flow of the material which course prevents short circuiting by obviating the danger of an accumulation of water-rich masses; and also by stating that in order to prevent the formation of short circuits within the liquid, due to chains of water-globules forming from one electrode to the other, it is necessary to prevent the potential difference between the electrodes from falling too low.

Our present improvement has to do with this important feature of preventing short-circuiting between the electrodes due to the formation of chains of water-globules, and our invention may be stated to consist in a process of this general nature wherein the emulsion while passing through the electric field, is throughout its entire course, agitated or stirred, in order to avoid short circuiting by limiting, retarding or breaking up the formation of the chains of water-globules.

In the accompanying drawings we show a form of apparatus in which our process may be carried out.

In these drawings—Figure 1 is a vertical sectional view of our apparatus. Fig. 2 is a section on line *x—x* of Fig. 1.

1 is an outer shell having a funnel shaped hopper, to which the emulsion to be treated is delivered by the pipe 2. Suspended from and within the shell 1 is the stationary outer electrode 3, which though it may be of any suitable structural character is here shown as a conical annular series of wires. Within the fixed outer electrode 3 and separated therefrom is a rotating inner electrode 4 which also may be of any suitable structural character, being here shown as a conical annular series of wires. This inner electrode 4 is carried by a shaft 5 which is itself mounted in a spider 6 which is supported upon insulators 7 on the top of the hopper of the shell 1. Rotary motion is imparted to the shaft 5 in any proper manner, as, for example, by means of a pulley 8 and belt 9. 10 is an outlet near the bottom of the shell 1, but raised above the floor thereof slightly, so that the separated water indicated by 11 may accumulate and rise sufficiently to flow off in a small stream through the lower portion of the outlet 10, while the oil will flow off through the remaining upper portion of the outlet and the two liquids may thus be received separately.

The outer or fixed electrode is electrically connected to the ground at 12, and is also connected by wire 13 to one of the high potential terminals of the step-up transformer T. The other high potential terminal of the transformer is electrically connected to the inner electrode 4 by a wire 14 to the shaft 5. The low potential terminals of the transformer are connected in any suitable manner with the source of electricity, as, for example, through the inductive resistance at R, as we find in practice that induced current is of advantage in balancing the load. The emulsion supplied through pipe 2 passes down from the hopper and is subjected to the electric field between the fixed electrode 3 and the rotating electrode 4. In its passage it is subjected throughout to the action of high potential charges and is de-emulsified, the water settling in the bottom of the shell 1, so that it can be readily withdrawn, leaving the oil dry. During the process the water drops or globules tend to arrange themselves in chains, adjacent globules then coalescing and finally separating out into larger masses. To prevent these chains, which tend to reach out from one electrode to the other, from short circuiting the electrodes, the emulsion in its entire course through the electric field is agitated or stirred, in the case here shown, by the rotation of the inner electrode, with the result of limiting or retarding the formation of the chains or of breaking them up, so that short circuiting will not take place.

In thus illustrating, by means of the rotation of the electrode, the agitation or stirring of the emulsion during its passage through the electric field, we are not to be understood as limiting ourselves to such means of agitation. The essential step in the process herein applied for is the agitation or stirring of the emulsion while passing through the electric field, and this may be effected in any suitable manner, though we suggest the rotating electrode as simple and practical.

Having thus described our invention what we claim as new and desire to secure by Letters Patent is:—

1. The improvement in the art of separating and collecting particles of one liquid suspended in another liquid which latter is essentially a non-conductor of electricity, consisting in passing the material to be treated through the field of electrodes connected to a source of electricity of sufficient voltage to produce coalescence of the suspended particles in such wise as to cause the separation of the two liquids throughout the body of the mixture; and agitating said mixture during and throughout its course through the electric field in such wise as to prevent the coalescing globules from forming complete chains short circuiting the electrodes.

2. The improvement in the art of separating and collecting particles of one liquid suspended in another liquid which latter is essentially a non-conductor of electricity, consisting in passing the material to be treated through the field of electrodes connected to a source of electricity of sufficient voltage to produce coalescence of the suspended particles in such wise as to cause the separation of the two liquids throughout the body of the mixture in which it is immersed, whereby said mixture during and throughout its course through the electric field is agitated with the effect of preventing the coalescing globules from forming complete chains short circuiting the electrodes.

3. The improvement in the art of separating and collecting particles of one liquid suspended in another liquid which latter is essentially a non-conductor of electricity, consisting in passing the material to be treated through the field of electrodes connected to a source of electricity of sufficient voltage to produce coalescence of the suspended particles in such wise as to cause the separation of the two liquids throughout the body of the mixture; and rotating at least one of the electrodes whereby said mixture during and throughout its course through the electric field is agitated with the effect of preventing the coalescing globules from forming complete chains short circuiting the electrodes.

In testimony whereof we have signed our names to this specification in the presence of two subscribing witnesses.

FREDERICK GARDNER COTTRELL.
ALLEN CHEEVER WRIGHT.

Witnesses:
Wm. F. Booth,
D. B. Richards.